April 28, 1970    G. O. ELLIS    3,508,290
LAUNCHING INTERSECTION FOR TRANSMISSION LINES
Filed Sept. 25, 1968
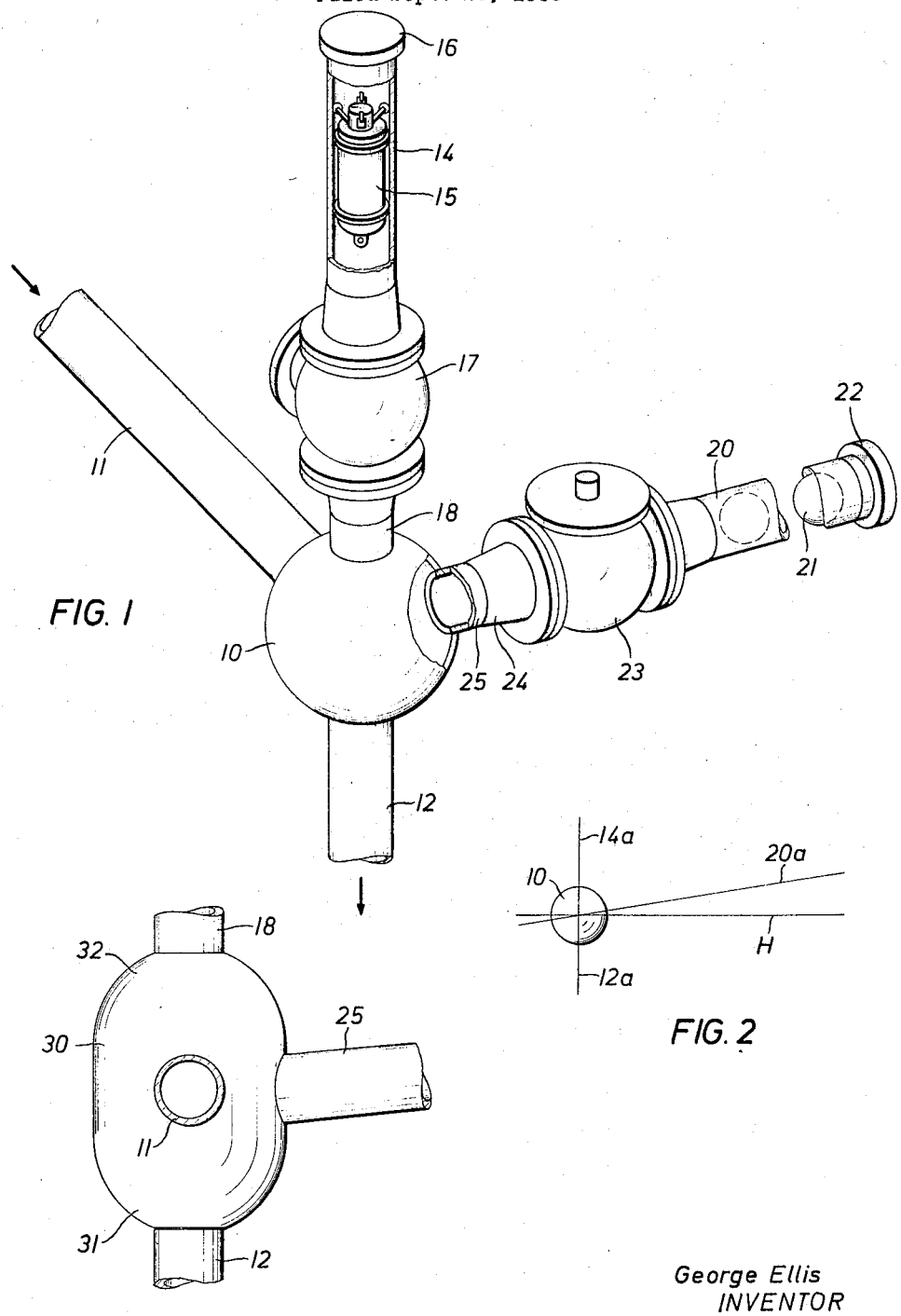
George Ellis
INVENTOR
BY Arnold, Roylance,
Kruger & Durkee
ATTORNEYS

United States Patent Office 3,508,290
Patented Apr. 28, 1970

3,508,290
LAUNCHING INTERSECTION FOR
TRANSMISSION LINES
George O. Ellis, Houston, Tex., assignor to Production Systems International, Inc., Houston, Tex., a corporation of Texas
Filed Sept. 25, 1968, Ser. No. 762,559
Int. Cl. B08b 9/04
U.S. Cl. 15—104.06            12 Claims

ABSTRACT OF THE DISCLOSURE

A compact intersection point for a gas transmission line or the like, for injecting inspection devices or spheres. A chamber having a diameter greater than that of the line provides the intersection, and the chamber is spherical or at least the lower side of the chamber surrounding the exit is hemispherical. Launching tubes for devices of various shapes and sizes are located generally in the upper part of the chamber, preferably vertical or slanted so that gravity aids in injecting the device.

BACKGROUND OF THE INVENTION

Transmission lines for natural gas or other petroleum products, extend for many thousands of miles in a grid throughout the country, very often underwater or underground. These lines are brought to the surface at intervals of perhaps 50 miles where pumping stations would be located to restore pressure in the lines. For offshore lines, these pumping stations would be located on platforms supported above the water line by structures extending to the ocean floor. These offshore platforms are constructed in as compact and economical manner as possible, and the fixtures thereon must be of simple and rugged design for long unattended operation with infrequent maintenance.

At the pumping stations along transmission lines are also located provisions for inserting and retrieving inspection means and other devices which are sent through the lines. Since the line is subjected to corrosion and damage of various types, and failure of the transmission line is both dangerous and costly to repair, it is necessary periodically to inspect the line for such defects using a device called an inspection "pig." Also, spheres are often sent through the line for various reasons, including that of sweeping liquid out of the pipe line, dividing products from one another, cleaning out debris or locating obstructions in the line. Devices of these types are inserted by launching tubes with suitable blocking chambers to avoid loss of pressure in the line. Different types of launching arrangements are needed for each type of pig; the elongated inspection pigs require a launch tube which is essentially coaxial with a section of the transmission line since these devices could not negotiate a sharp turn as at a T-section. Spherical pigs may be inserted at a T-section, but each size requires a separate junction, and the T-sections impose disruptions in the line for devices injected in preceding locations. In any event, using conventional structures for injecting a number of different sized and shaped pigs at a given point in a large line, a composite structure results which is rather lengthy; for offshore stations the arrangement cannot be stretched out horizontally due to lack of space on the platform, yet it is unduly costly to construct a tower high enough to accommodate the entire string, and even so it becomes unwieldy to lift the inspection devices to the top of such a tower for insertion. Further, the tower and equipment become vulnerable to wind and damage when constructed in this manner.

The launching tubes as discussed above must be duplicated at each station or a platform with similar equipment for recovering the pigs, as the devices must be removed from the line prior to the compressor or pump and again inserted after the pump. This duplication further imposes size limitations on the launchers.

It is therefore a primary feature of this invention to provide equipment for injecting devices of various sizes and shapes into a gas transmission line or the like, at a common intersection, without requiring an unduly complex, heavy, elevated or lengthy structure. Another feature is the provision of a pig injecting arrangement which is particularly adapted for use at offshore locations. Also, a feature is the provision of an improved launching arrangement for transmission lines, which is compact, simplified, and provides flow which is less impeded than in prior equipment.

In accordance with this invention, in one embodiment, a spherical chamber of diameter much larger than that of the line provides a common intersection point into which a plurality of launching tubes may be connected. The launching tubes preferably join the upper half of the chamber, with the gas outlet being in the lower side, so that gravity aids in launching the devices. The chamber may be elongated to accommodate a larger number of launching tubes. The lower end of the chamber is curved inward toward the outlet, as in a hemispherical shape, to aid in directing the injected devices toward the outlet. The sizes of the various inlets, outlets, launching tubes, etc., are selected to provide the proper relationships.

The drawings:

Novel features which are believed characteristic of the invention are set forth in the appended claims. The invention itself, however, as well as further features and advantages thereof, may best be understood by reference to the following detailed description of particular embodiments, when read in conjunction with the accompanying drawing, wherein:

FIGURE 1 is a pictorial view, partly broken away, of an intersection for a gas transmission line, in accordance with one embodiment of the invention;

FIGURE 2 is a schematic representation of the center lines of the various tubes and pipes in the embodiment of FIGURE 1; and FIGURE 3 is an elevation view of an intersection in accordance with another embodiment of the invention.

It will be noted that like parts appearing in several views of the drawing will bear like reference numerals. The drawing forms a part of this specification and is incorporated herein.

DETAILED DESCRIPTION OF SPECIFIC EMBODIMENT

With reference now to FIGURE 1, an exemplary embodiment of the invention is shown wherein a spherical chamber 10 is used in a structure for launching devices into a gas transmission line or the like. An inlet transmission line or pipe 11 intercepts the chamber 10 on one side thereof, while an outlet line or pipe 12 exits from the lower side of the sphere. This structure of FIGURE 1 would ordinarily be located at an intermediate position in the transmission line as at a pumping station. The structure might very well be located on an offshore platform at some point between the source of the gas, or the wells, and the terminal point or area of distribution to customers. Intercepting the upper side of the sphere 10 and extending generally in a vertical direction, is a launching tube 14 which may be of the type used for injecting or inserting pipeline line inspection equipment such as the so-called "Linalog" inspection devices provided by the AMF Tuboscope Co. of Houston, Tex.

The inspection devices or pigs may consist of elongated cylindrical bodies having appropriate inspection equipment such as magnetic-type flaw detectors mounted thereon. Usually, two or more rubber packers or cups surround the cylinder to trap gas behind the device and thus propel the inspection tool. Also, a centralizer assembly in the form of spring-biased wheels is positioned at the rear of the tool. This inspection device or pig may be from several feet up to perhaps fifteen to twenty feet in length, sometimes including several sections connected by U-joints, and so it cannot negotiate right angle turns and must be launched generally in a straight line relationship with the pipe, or generally coaxial, as the tube 14 is with respect to the outlet 12.

A removable cap or seal 16 is provided at the upper end of the tube 14 to permit inserting the pig, then to allow sealing the upper end so that the chamber containing the pig 15 may be pressurized prior to launching. A valve 17 is interposed between the tube 14 and the sphere 10, this valve being of the type with essentially full open seat, such as ball or gate types, functioning to seal the tube 14 from the gas pressure while the pig is being inserted, then to fully open the tube 14 to the chamber 10 to launch the pig. A coupling 18 between the valve 17 and the spherical chamber 10 would be fabricated as part of the sphere arrangement, and the coupling to the valve 17 would be welded or otherwise fixed thereto.

Extending from one side of the sphere 10 is a ball launching tube 20 to inject spherical pigs or balls 21 of the type seen in broken-away illustration. These devices are used to clear liquid or debris from the line, to locate obstructions, to separate one product from another, to indicate at the receiving end that the products are being changed or other indications, and for other purposes as well known. A number of these, perhaps twenty, would be inserted into the tube 20, and the tube sealed by a cap 22, then the balls would be launched one at a time into the transmission line by means of a ball launcher valve 23. The ball launcher might consist of a standard block valve of the type adapted for launching one sphere at a time and blocking the remainder of the spheres within the tube 20 from entering the transmission line. The tube 20 and the valve 23 would be of about the same, or perhaps greater, internal diameter as that of the pipe 12 and of the balls 21. If a difference in diameter must be accounted for, a tapered section 24 would be used to couple the valve 23 to a coupling 25, it being understood that the coupling 25 would be suitably joined to the tapered portion 24, as by a weld.

It may be noted that the tube 20 is shown foreshortened, whereas actually the length of this tube would be perhaps 40 feet or more. In this manner, a fairly large number of the spheres could be loaded in the tube at one time, so that the sealing cap 22 need not be repeatedly opened. The spheres 21 are usually composed of rubber or other resilient material, and may be slightly oversized to assure close fit in the transmission line.

While not apparent in the pictorial view of FIGURE 1, the central axis of the tube 20 would be at an angle with respect to a horizontal plane through the sphere 10, so that the tube 20 slants downward toward the sphere. This is apparent in FIGURE 2, wherein a line 20a represents the axis of the tube 20, which forms an acute angle with a horizontal plane H passing through the center of the spherical chamber 10. Also, a central axis 14a for the tube 14 is vertical, as is a central axis 12a for the outlet 12. The axis of the inlet 11 lies in the horizontal plane H and is not seen in FIGURE 2.

The diameter of the launching tube 20 may be somewhat greater than that of the transmission line including the outlet pipe 12. For example, the tube 20 may be a 30 inch diameter pipe, while the outlet 12 may be a 24 inch diameter pipe. The spheres 21, however, would be of about the same or only slightly larger diameter than the I.D. of the tube 20 or the pipe 12. This permits ease of pressurization of the entire tube 20 from the line pressure, as well as ease of handling of the spheres and injecting them into the line through the valve 23. The diameter of the inlet pipe 11, incidentally, may be somewhat smaller or larger than that of the outlet pipe 12, and this may tend to aid in forcing whatever is injected into the sphere 10 on into the outlet pipe 12 due to the pressure differential between inlet and outlet. For example, the pipe 11 may be of about 20 inch diameter when the pipe 12 is of 24 inch diameter. In this example, the sphere 10 would have an I.D. of about 45 inches.

Referring to FIGURE 3, another embodiment of the invention is shown wherein the chamber is in the form of a cylinder 30 having hemispherical ends 31 and 32. This would permit connection of a large number of inlets or injection tubes, more than that permitted by the sphere 10 of FIGURE 1. Still, the lower end adjacent the outlet pipe 12 would be hemispherical in shape and would function to guide the injected device toward the outlet. Although only two injecting tubes are shown as before, it is seen that perhaps 6 or 8 could easily be positioned around the surface of the chamber 30 and upper end 32.

While the invention has been described with reference to particular embodiments, this description is not meant to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. Apparatus for launching pigs of the spherical and elongated types into a gas transmission line or the like, comprising a generally spherical chamber of interior diameter substantially greater than that of the transmission line, an inlet comprising a cylindrical conduit intercepting the chamber adjacent one side thereof, an outlet comprising a cylindrical conduit intercepting the spherical chamber adjacent the lower side thereof, at least one launching tube extending generally upwardly from adjacent the top of the spherical chamber, and at least one launching tube intercepting the spherical chamber adjacent another side thereof, at least one of the launching tubes being suitable for launching spherical pigs and at least one other being suitable for launching elongated pigs of the inspection type, valve means being interposed between each of the launching tubes and the spherical chamber.

2. Apparatus according to claim 1 wherein the interior diameter of the spherical chamber is about twice that of the gas transmission line.

3. Apparatus according to claim 1 wherein the launching tube for the elongated pigs extends generally coaxial with the outlet from the side of said spherical chamber opposite the outlet.

4. Apparatus according to claim 3 wherein the interior diameters of the inlet and outlet cylindrical conduits are about the same as that of the corresponding parts of the transmission line, and the diameters of the launching tubes at the points of interception with the spherical chamber are sized according to the diameters of the pigs to be injected.

5. Apparatus according to claim 4 wherein the launching tube for spherical pigs intercepts the spherical chamber adjacent a side thereof, and such launching tube inclines upward in a direction away from the spherical chamber.

6. Apparatus according to claim 4 wherein the launching tube for elongated pigs is positioned directly above the outlet and is aligned coaxially therewith.

7. Apparatus according to claim 6 wherein the launching tube for the spherical pigs is inclined downward toward the spherical chamber.

8. Apparatus for launching a plurality of different types of self-propelled traveling devices into a transmission line of the type used for hydrocarbon products, at a given location, comprising a chamber having a diameter substantially greater than that of the transmission line, with an inlet pipe from the line intercepting the chamber, and an outlet pipe to the line intercepting the chamber at the lower side thereof, the interior of the chamber being shaped in a curved surface at least at the lower side thereof surrounding the outlet pipe, a plurality of launching tubes intercepting the chamber in the upper portion thereof with each launching tube being of the type having a tube for containing the traveling device, and valving means interposed between such tube and the chamber.

9. Apparatus according to claim 8 wherein the chamber is of an upright cylindrical shape having a generally hemispherical lower side.

10. Apparatus according to claim 9 wherein the chamber is of a generally hemispherical shape at both ends.

11. Apparatus according to claim 8 wherein the chamber is of spherical shape.

12. Apparatus according to claim 11 wherein a launching tube for elongated devices is positioned directly opposite the outlet pipe and aligned generally coaxial therewith.

References Cited

UNITED STATES PATENTS 3,218,660   11/1965   Eagleton.

EDWARD L. ROBERTS, Primary Examiner

U.S. Cl. X.R.

137—268; 166—70